May 24, 1966     D. L. CUMMINS     3,253,210
TRANSISTOR VOLTAGE REGULATOR
Filed Feb. 4, 1963
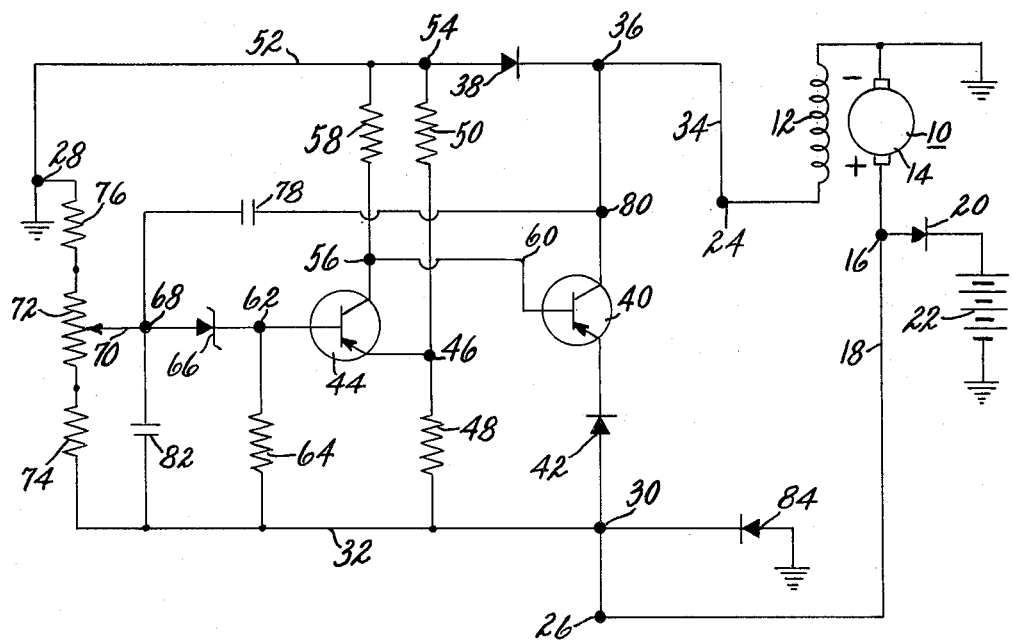
INVENTOR.
DONALD L. CUMMINS
BY C. R. Meland
HIS ATTORNEY United States Patent Office 3,253,210
Patented May 24, 1966

3,253,210
TRANSISTOR VOLTAGE REGULATOR
Donald L. Cummins, Anderson, Ind., assignor to General Motors Corporation, Detroit, Mich., a corporation of Delaware
Filed Feb. 4, 1963, Ser. No. 255,850
12 Claims. (Cl. 322—28)

This invention relates to transistor voltage regulators and more particularly to a transistor voltage regulator which can be used in automotive applications to regulate the output voltage of a generator on a motor vehicle.

The present invention is related to a regulating system disclosed in a patent to Hetzler, 2,945,174, and a regulating system disclosed and claimed in co-pending application Serial No. 756,685, filed on August 22, 1958, now Patent 3,098,964, and assigned to the assignee of this invention.

The regulating systems disclosed in Hetzler patent, 2,945,174, and in the above-noted co-pending patent application Serial No. 756,685, now Patent 3,098,964, are both of the type wherein a power transistor controls the current flow through the field winding of a generator and wherein this power transistor has its conduction controlled by a driver transistor. In this system, the transistors are driven to fully conductive or fully nonconductive conditions to reduce heating of the transistors.

The present invention relates to a transistor regulator of the type described above wherein the transistors are switched between fully conductive and fully nonconductive conditions. The transistor regulator of this invention is designed to compensate for the leakage current of the driver transistor and this makes it possible to use the transistor regulator in higher temperature conditions. The system of this invention also makes it possible to use lower cost transistors especially in the driver stage since the system adequately compensates for leakage current of this transistor.

It accordingly is one of the objects of this invention to provide a transistor regulator which is capable of being operated over a wider temperature range than those heretofore known. This object is realized by providing a circuit network for the driver transistor which applies a back bias to the driver transistor to cut down the leakage current of this transistor as the ambient temperature in which it is operating increases.

Another object of this invention is to provide a transistor regulating system having a power output transistor and a driver transistor and to provide a voltage dividing circuit which is connected across the output voltage of a generator and which provides a voltage reference point connected with the emitter electrode of the driver transistor for providing a back bias to this transistor.

Further objects and advantages of the present invention will be apparent from the following description, reference being had to the accompanying drawings wherein preferred embodiments of the present invention are clearly shown.

In the drawing:

The single figure drawing is a schematic circuit diagram of a transistor voltage regulator made in accordance with this invention.

Referring now to the drawing, the reference numeral 10 designates a generator for supplying the electrical loads on a motor vehicle. This generator has a field winding 12 and an armature or output winding 14. The generator 10 has a D.C. output and may be of a type commonly referred to as a D.C. generator where the generator has a commutator. On the other hand, the generator may be of a type which has its output voltage rectified by diodes in a manner illustrated in the above-noted co-pending application, Serial No. 756,685, now Patent 3,098,964. The term "direct current power source" as used hereinafter or the term "generator" as used hereinafter is intended to cover a diode-rectified generator or a generator that has a commutator.

One output terminal of the armature 14 is grounded whereas the other output terminal 16 is connected with a conductor 18. The D.C. output voltage appears between junction 16 and ground regardless of the type of generator used and where the generator has a commutator, a diode 20 is connected between the junction 16 and the positive side of a battery 22. The opposite side of the battery 22 is grounded and it will be appreciated that various other electrical loads can be placed in parallel relationship with the battery and be fed by the generator 10.

The transistor regulator of this invention has a field terminal 24 which is connected with one side of the field winding 12 of generator 10. The regulator has a positive terminal 26 which is connected with the positive terminal 16 of the generator 10 by conductor 18. The negative terminal of the transistor regulator is designated by reference numeral 28 and this terminal is grounded as shown and is therefore connected with the negative side of the generator 10.

The positive terminal 26 is connected with junction 30 which in turn is connected with a conductor 32 which will be at substantially the same positive potential as positive terminal 16. The field terminal 24 is connected with conductor 34 and this conductor is connected to the junction 36 and to one side of a silicon diode 38. This diode 38 as is well-known to those skilled in the art is a PN junction device.

The power output transistor which controls the field current of the field winding 12 is designated by reference numeral 40. This transistor is of the PNP type having a collector connected with junction 36 and an emitter connected to one side of a PN junction semiconductor diode 42 which is preferably of the silicon type. The opposite side of diode 42 is connected with the junction 30 on conductor 32.

The driver transistor of the transistor regulator is designated by reference numeral 44. This transistor is of the PNP type and has an emitter electrode connected with junction 46. A resistor 48 is connected between junction 46 and the conductor 32. A second resistor 50 connects the junction 46 with a negative conductor 52 at junction 54. It is seen that the diode 38 is connected between junctions 54 and 36. The collector electrode of transistor 44 is connected with junction 56. A resistor 58 is connected between junction 56 and the negative conductor 52. It is seen that a conductor 60 connects the junction 56 with the base electrode of transistor 40 and therefore connects the collector electrode of transistor 44 with the base electrode of transistor 40.

The base electrode of transistor 44 is connected with junction 62. A resistor 64 connects the junction 62 with the positive conductor 32.

A Zener diode 66 is connected between junctions 62 and 68. This diode has a predetermined breakdown voltage and until this breakdown voltage is attained, it does not conduct in a reverse direction. When the breakdown voltage is exceeded, a current will flow from junction 62 toward junction 68 and the Zener diode will then operate as a constant voltage device.

The junction 68 is connected with the adjustable tap 70 of a potentiometer resistor 72. A resistor 74 connects one side of the potentiometer resistor with the positive conductor 32 while another resistor 76 connects the opposite side of the potentiometer resistor 72 with junction 28. It will be appreciated that resistors 74, 72 and 76 provide a voltage divider network which is connected across the positive and negative conductors 32 and 52.

A feedback capacitor 78 is connected between junctions 68 and 80 and another capacitor 82 connects the junction 68 with the positive conductor 32.

A diode 84 of the PN junction semiconductor type and preferably of the silicon type is connected between the junction 30 and ground. The function of diode 84 is to protect the transistors from transient voltage surges.

The operation of the transistor regulator of this invention will now be described.

It can be seen that the current that flows through the field winding 12 is dependent upon the conduction of transistor 40 in its emitter-collector circuit. This circuit can be traced from the positive terminal 16, through conductor 18, through terminal 26, through junction 30, through silicon diode 42, through the emitter-collector circuit of transistor 40, through junction 36, through conductor 34, and then through field winding 12 to the negative side of the generator 10.

The conduction of transistor 40 is determined by the conduction of transistor 44 in its emitter-collector circuit. Thus when transistor 44 is substantially fully conductive in its emitter-collector circuit, the junction 56 has a positive potential which drives the base of transistor 40 positive. This applies a bias to the transistor 40 which tends to switch this transistor completely off in its emitter-collector circuit. In addition, any leakage current that flows through the diode 42 provides a potential drop which drives the emitter of the transistor 40 in a negative direction. This aids in maintaining the transistor 40 switched off since leakage current which is passed through the emitter-collector circuit for transistor 40 causes a voltage drop across diode 42 which tends to bias the transistor 40 to its fully nonconductive condition.

When transistor 44 is substantially nonconductive in its emitter-collector circuit, the junction 56 is at substantially the same potential as negative conductor 52 which drives the base of transistor 40 in a negative condition. This will switch the transistor 40 to its fully conductive condition in its emitter-collector circuit so that full field current flows through the field winding 12. The operation is such that the transistor 40 is continuously switched on and off in its emitter-collector circuit and this transistor is never permitted to operate in any other condition but fully on or fully off.

The conduction of transistor 44 is determined by the amount of voltage appearing between the tap 70 and the negative conductor 52. This voltage is proportional to the output voltage of the generator 10 since the voltage divider network comprised of resistors 74, 72 and 76 is connected directly across lines 32 and 52.

When the output voltage of the generator 10 is above the desired regulated value, the Zener diode 66 breaks down in a reverse direction. This permits current to flow from positive conductor 32, through resistor 48, through the emitter-base circuit of transistor 44, through Zener diode 66, through junction 68, through the upper half of potentiometer resistor 72 and then through resistor 76 to ground. The transistor 44 will not be switched to its fully conductive condition in its emitter-collector circuit to cause the transistor 40 to be switched off.

When transistor 40 is switched off, the output voltage of the generator 10 drops and a point is reached where the transistor 44 becomes biased to a nonconductive condition. This will cause the transistor 40 to switch back to its conductive condition and the transistor 40 continues this switching on and off during operation of the regulator.

The function of resistors 48 and 50 is to provide a back bias for the transistor 44 when transistor 44 is biased to its nonconductive state. It can be seen that current can flow from conductor 32, through resistor 48, through junction 46, and through the resistor 50 to negative conductor 52. The voltage drop across resistor 48 drives the junction 46 negative with respect to positive conductor 32. In addition, any leakage current that flows through the emitter-collector circuit of transistor 44 and through resistor 48 tends to drive junction 46 more negative to therefore aid in maintaining this transistor 44 turned off. Since this leakage current increases with an increase in the temperature in which the transistor 44 is operating, the circuit compensates for increased temperatures.

The resistance values of resistors 48 and 64 are such that when transistor 44 is nonconductive in its emitter-collector circuit, the voltage drops across resistors 64 and 48 are such that junction 46 is driven negative with respect to junction 62. The voltage drop across resistor 64 will be due to a small current flow through Zener diode 66 in a reverse direction when this diode is conducting in its reverse direction. This, of course, occurs when the voltage between tap 70 and line 32 is sufficient to break down the Zener diode 66.

The capacitor 78 is a feed-back capacitor which is operative to help drive the transistor 40 either to its fully conducting or its fully nonconducting condition once this transistor is being driven toward either of these conditions. This capacitor thus helps insure that the transistor 40 will be operated either in its fully conductive or its fully nonconductive condition. The diode 38 is a transient voltage suppression diode which is connected across the field winding 12.

The diode 84 is a voltage transient suppressing diode which protects the transistors 40 and 44 from voltage transients that might be generated in the loads being supplied between junction 30 and ground.

It can be seen from the foregoing that a transistor voltage regulator has been provided which is operative to cause the transistor 40 to switch between fully conductive and fully nonconductive conditions. It also can be seen that the resistors 48, 50 and 64 play an important part in this transistor regulator in that they compensate for the leakage current of transistor 44 and therefore insure that this transistor will be switched completely off under certain conditions of operation and insure that this transistor will be switched off even though the temperature in which the transistor regulator is operating increases to a point to cause emitter-collector leakage current.

While the embodiments of the present invention as herein disclosed, constitute a preferred form, it is to be understood that other forms might be adopted.

What is claimed is as follows:

1. A voltage regulator having positive, negative and field terminals comprising, a first transistor having emitter, collector and base electrodes, a circuit connecting said positive terminal and said field terminal including the emitter-collector circuit of said first transistor, a second transistor having emitter, collector and base electrodes, a biasing network including a resistor connected across said positive and negative terminals, means connecting said resistor between said positive terminal and the emitter-electrode of said second transistor, means connecting the collector electrode of said second transistor with said negative terminal, means connecting the collector electrode of said second transistor with the base electrode of said first transistor, means providing a reference potential point the potential of which varies in accordance with the voltage appearing across said positive and negative terminals, a Zener diode connected between said reference potential point and the base electrode of said second transistor, and a circuit connecting the junction of said Zener diode and base electrode of said second transistor with said positive terminal, said resistor providing a current path for the emitter-collector current of said second transistor.

2. A transistor voltage regulator comprising, first, second and third terminals, a first transistor having emitter, collector and base electrodes, a semiconductor diode, a circuit connecting said first and second terminals including said semiconductor diode and the emitter-collector circuit of said first transistor, a second transistor having emitter, collector and base electrodes, a resistor connecting the collector electrode of said second transistor with said third terminal, a first voltage divider connected across said first and third terminals having a junction, means connecting the emitter electrode of said second transistor with said junction, means connecting the collector electrode of said second transistor with the base electrode of said first transistor, a second voltage divider connected across said first and third terminals, a Zener diode connected between said second voltage divider and the base electrode of said second transistor, and a resistor connecting the base electrode of said second transistor with said first terminal, a portion of said first voltage divider connecting the emitter of said second transistor with one side of said direct current circuit whereby emitter current for said second transistor flows through said portion of said first voltage divider.

3. An electric circuit comprising, first and second transistors each having emitter, collector and base electrodes, a source of direct current voltage, a current consuming device, a circuit connected across said source of direct current voltage including the emitter-collector circuit of said first transistor and said current consuming device, means connecting the collector electrode of said second transistor with one side of said voltage source and with the base electrode of said first transistor, a continuously conductive biasing circuit connected directly across said source of direct current voltage having a junction, means connecting the emitter electrode of said second transistor with said junction, said biasing circuit including a resistor connected between said junction and one side of said source of direct current voltage, the current flow through said resistor including the sum of the current supplied to the emitter-electrode of said second transistor and the current that flows through said biasing circuit, and means connecting the base electrode of said second transistor with a voltage reference point, the potential of which varies as a function of the output voltage of said source of direct current voltage.

4. In combination, a generator having a field winding, a two lead direct current circuit energized by said generator, a first transistor having emitter, collector and base electrodes, a first circuit connected across said two lead direct current circuit including a semiconductor diode, the emitter-collector circuit of said first transistor and said field winding, one side of said diode being directly connected with one lead of said direct current circuit, a second transistor having emitter, collector and base electrodes, a continuously conductive voltage divider network connected across said direct current circuit having a junction, means connecting the emitter electrode of said second transistor with said junction, means connecting the collector electrode of said second transistor with the base electrode of said first transistor, means connecting the collector electrode of said second transistor with one lead of said direct current circuit, a Zener diode, and means connecting said Zener diode between the base electrode of said second transistor and a potential point which has a potential which varies in accordance with the output voltage of said generator.

5. A transistor voltage regulator for regulating the output voltage of a generator comprising, first, second and third terminals, said first and second terminals being adapted to be connected with said generator and said third terminal being adapted to be connected with the field of said generator, a first transistor having emitter, collector and base electrodes, means connecting the emitter-collector circuit of said first transistor across said first and third terminals, a second transistor having emitter, collector and base electrodes, a biasing circuit including at least one resistor connected across said first and second terminals, said resistor connecting the emitter of said second transistor with said first terminal whereby emitter current for said second transistor flows through said resistor, a voltage divider network connected across said first and second terminals, a Zener diode connecting the base electrode of said second transistor with a point on said voltage divider, and means connecting the collector electrode of said second transistor and the base electrode of said first transistor with said second teminal.

6. The transistor voltage regulator according to claim 5 where a semiconductor diode is connected between the emitter of the first transistor and said first terminal.

7. The transistor voltage regulator according to claim 5 where a resistor is connected between the base electrode of the second transistor and said first terminal.

8. A transistor voltage regulator for regulating the output voltage of a generator which has a field winding comprising, a field terminal adapted to be connected with the field winding of a generator, first and second terminals adapted to be connected with the output winding of said generator, first and second transistors each having emitter, collector and base electrodes, means connecting the emitter-collector circuit of said first transistor between said first terminal and said field terminal, a biasing network connected across said first and second terminals including at least one resistor, said biasing network providing a first current path connecting said first and second terminals, said resistor forming a part of a second current path which connects said first and second terminals and which includes the emitter-collector circuit of said second transistor, means including a Zener diode connected with the base electrode of said second transistor for controlling its conduction in accordance with the voltage appearing across said first and second terminals, means connecting the collector electrode of said second transistor and the base electrode of said first transistor with said second terminal and a resistor directly connecting the base electrode of said second transistor with said first terminal.

9. A transistor voltage regulator for regulating the output voltage of a generator which has a field winding comprising, a field terminal adapted to be connected with the field winding of a generator, positive and negative terminals, said positive and negative terminals being adapted to be connected with the output of a generator, a first transistor having emitter, collector and base electrodes, means connecting the emitter-collector circuit of said first transistor across said positive and field terminals, a second transistor having emitter, collector and base electrodes, means connecting the collector electrode of said second transistor and the base electrode of said first transistor together and to said negative terminal, a biasing network connected between said positive and negative terminals including a junction, said biasing circuit including a resistor connected between said junction and said positive terminal, means connecting the emitter of said second transistor to said junction, said resistor carrying the emitter current for said second transistor and carrying the current flowing through said biasing network, and means for controlling the conduction of said second transistor connected with said positive and negative terminals, said means including a Zener diode connected with the base electrode of said second transistor.

10. A transistor voltage regulator for regulating the output voltage of a generator having a field winding comprising, a field terminal, first and second terminals, first and second transistors each having emitter, collector and base electrodes, said first transistor being connected in series with said field terminal, said second transistor being connected across said first and second terminals which are adapted to be energized by said generator, means interconnecting said transistors whereby said first transistor is substantially fully conductive when said second transistor is substantially fully nonconductive and vice versa, means for controlling the conduction of said second transistor in accordance with the output voltage of a generator including a Zener diode connected with the base of said second transistor and with said first and second terminals, and means for applying a bias voltage to the emitter electrode of said second transistor of such a polarity as to turn-off said second transistor when it is biased to a non-conductive condition by said Zener diode, said last-named means including a circuit connected across said first and second terminals which has a resistor connected between the emitter of said second transistor and said first terminal.

11. A transistor voltage regulator for regulating the output voltage of a generator having a field winding comprising, first, second and third terminals, said first and second terminals being adapted to be energized by said generator and said third terminal being adapted to be connected with the field winding of a generator, a first transistor having emitter, collector and base electrodes, means connecting the emitter-collector circuit of said first transistor between said first and third terminals, a second transistor having emitter, collector and base electrodes, voltage sensing means connected with the base electrode of said second transistor and with said first and second terminals for biasing said second transistor to a conductive or a nonconductive condition in its emitter-collector circuit, said last named means including a Zener diode, means connecting the collector electrode of said second transistor and the base electrode of said first transistor with said second terminal whereby said second transistor is driven substantially fully conductive when said first transistor is substantially fully nonconductive, and means for providing a biasing voltage for said second transistor to maintain it in its nonconductive condition when said second transistor is biased to a nonconductive condition by said voltage sensing means, said last named means including a resistor connected between the emitter electrode of said second transistor and said first terminal, the opposite side of said resistor being connected with said second terminal through a biasing circuit and through the emitter-collector circuit of said second transistor.

12. A transistor voltage regulator for regulating the output voltage of a generator which has a field winding comprising, first, second and third terminals, said first and second terminals being adapted to be energized by said generator and said third terminal being adapted to be connected with said field winding, a first transistor having emitter, collector and base electrodes, means connecting the emitter-collector circuit of said first transistor between said first and third terminals, a second transistor having emitter, collector and base electrodes, a first voltage divider network comprised solely of resistive circuit elements connected across said first and second terminals including a resistor, said voltage divider network having a junction, means connecting the collector of said second transistor and the base of said first transistor with said second terminal, means connecting the emitter of said second transistor with said junction of said first voltage divider, a second voltage divider connected across said first and second terminals, and a Zener diode connected between the base of said second transistor and a point on said second voltage divider, said second transistor being biased substantially fully conductive or fully nonconductive depending upon the voltage appearing across said first and second conductors, said resistor applying a voltage to the emitter of said second transistor which maintains it at a nonconductive condition when said second transistor is biased to a nonconductive condition by said Zener diode.

References Cited by the Examiner

UNITED STATES PATENTS

| | | | |
|---|---|---|---|
| 2,892,143 | 6/1959 | Sommer | 322—28 |
| 3,005,146 | 10/1961 | Luscher | 322—25 |
| 3,098,966 | 7/1963 | Raver | 322—73 |

LLOYD McCOLLUM, *Primary Examiner.*

A. H. TISCHER, *Assistant Examiner.*